United States Patent
Herzog et al.

(10) Patent No.: US 11,072,330 B2
(45) Date of Patent: Jul. 27, 2021

(54) TRAILER TOWING ASSISTANT FOR TIGHT SPOT REVERSAL

(71) Applicant: Continental Automotive Systems, Inc., Auburn Hills, MI (US)

(72) Inventors: Brandon Herzog, Waterford, MI (US); Jeremy McClain, Oxford, MI (US); Ibro Muharemovic, Warren, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/032,832

(22) Filed: Jul. 11, 2018

(65) Prior Publication Data

US 2018/0319401 A1    Nov. 8, 2018

Related U.S. Application Data

(63) Continuation of application No. PCT/US2017/013344, filed on Jan. 13, 2017.
(Continued)

(51) Int. Cl.
*B60W 30/18* (2012.01)
*B62D 13/06* (2006.01)
(Continued)

(52) U.S. Cl.
CPC ....... *B60W 30/18036* (2013.01); *B62D 13/06* (2013.01); *B62D 15/0285* (2013.01);
(Continued)

(58) Field of Classification Search
CPC ..... B60W 30/18036; B60W 2300/145; B60W 2530/14; B60W 2720/22; B62D 13/06;
(Continued)

(56) References Cited

U.S. PATENT DOCUMENTS 6,170,591 B1 *  1/2001  Sakai ................. B62D 15/0285
                                                        180/204
2008/0009990 A1   1/2008  Katoh et al.
(Continued)

FOREIGN PATENT DOCUMENTS

EP       0849144 A2   6/1998
GB       2493430 A    2/2013
(Continued)

OTHER PUBLICATIONS

International Search Report and the Written Opinion of the International Searching Authority dated Jun. 12, 2017 for corresponding PCT application PCT/US2017/013344.
(Continued)

*Primary Examiner* — Rami Khatib

(57) ABSTRACT

A method of controlling a vehicle-trailer unit includes recording, with an electronic control unit for a trailer assist system, a plurality of maneuvers of the vehicle-trailer unit as each maneuver is executed in an original direction of travel. The method also includes retrieving the recorded plurality of maneuvers in response to an initiating of a tight spot reversal feature for the trailer assist system. The method further includes instructing vehicle systems to perform the retrieved recorded plurality of maneuvers in the reverse order and direction of travel in which they were recorded.

6 Claims, 1 Drawing Sheet

Related U.S. Application Data

(60) Provisional application No. 62/278,903, filed on Jan. 14, 2016.

(51) Int. Cl.
*B62D 15/02* (2006.01)
*G05D 1/00* (2006.01)
*G05D 1/02* (2020.01)

(52) U.S. Cl.
CPC ......... *G05D 1/0088* (2013.01); *G05D 1/0212* (2013.01); *B60W 2300/145* (2013.01); *B60W 2530/14* (2013.01); *B60W 2540/30* (2013.01); *B60W 2720/22* (2013.01); *G05D 2201/0213* (2013.01)

(58) Field of Classification Search
CPC ............. B62D 15/0285; G05D 1/0088; G05D 1/0212; G05D 2201/0213
See application file for complete search history.

(56) References Cited

U.S. PATENT DOCUMENTS

| | | | | |
|---|---|---|---|---|
| 2013/0035821 A1* | 2/2013 | Bonne | ................ | B62D 15/0285 701/25 |
| 2014/0358429 A1* | 12/2014 | Shutko | .................. | H04N 7/183 701/458 |
| 2015/0066296 A1* | 3/2015 | Trombley | .............. | B62D 13/06 701/41 |
| 2016/0039456 A1* | 2/2016 | Lavoie | ................. | B62D 15/027 701/41 |
| 2016/0114831 A1* | 4/2016 | Laine | ..................... | B62D 13/06 701/41 |
| 2017/0008563 A1* | 1/2017 | Popken | .................. | G08G 1/168 |
| 2020/0010076 A1* | 1/2020 | Yamamoto | ............. | B62D 13/06 |
| 2020/0081446 A1* | 3/2020 | Ishinoda | ................ | B60R 99/00 |

FOREIGN PATENT DOCUMENTS

| | | |
|---|---|---|
| JP | H10167103 A | 6/1998 |
| JP | 2003034261 A | 2/2003 |
| JP | 2007237930 A | 9/2007 |
| JP | 2014141175 A | 8/2014 |
| WO | 2014185828 A1 | 11/2014 |
| WO | 2015001054 A2 | 1/2015 |

OTHER PUBLICATIONS

Japanese Notification of Reasons for Refusal dated Jul. 16, 2019 for corresponding JP Pat. Appl. No. 2018-536812.

* cited by examiner

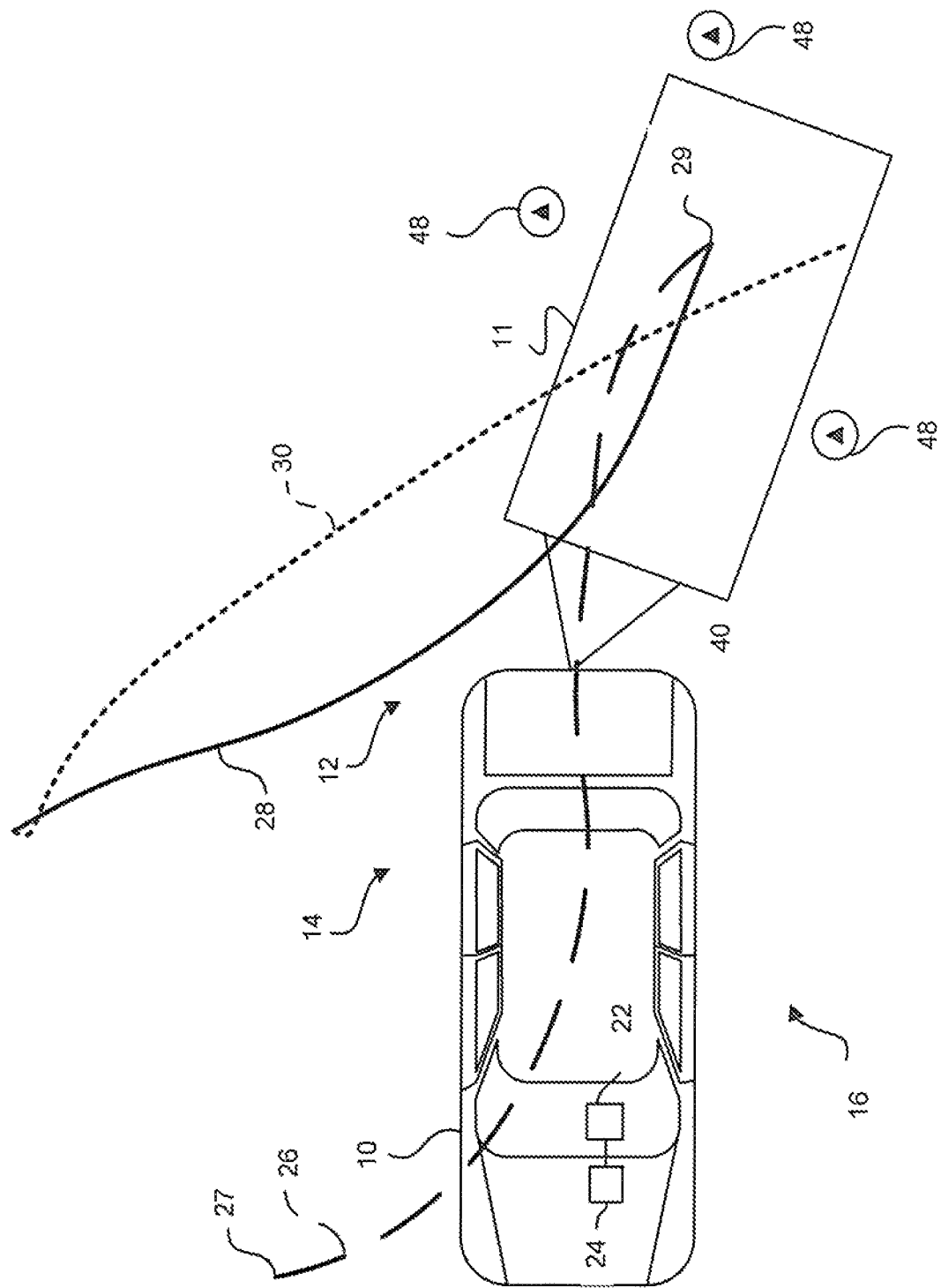

TRAILER TOWING ASSISTANT FOR TIGHT SPOT REVERSAL

CROSS REFERENCE TO RELATED APPLICATION

This application is the National Stage of International Application No. PCT/US2017/013344, filed on Jan. 13, 2017, which claims the benefit of U.S. provisional application No. 62/278,903, filed Jan. 14, 2016, each of which is hereby incorporated by reference.

TECHNICAL FIELD

The present disclosure relates to automotive vehicles and more particularly to advance driver assistance systems for automotive vehicles.

BACKGROUND

A trailer is typically connected to a towing vehicle through a trailer hitch. The trailer hitch allows the trailer to swivel around the hitch horizontally so that the vehicle-trailer unit is able to move around corners. When a vehicle-trailer unit turns the trailer follows a shorter path than the vehicle. The longer the wheel-base is, the shorter the path the trailer wheels take during a turn, i.e. the turning radius of the trailer is decreased. To compensate for the short turning path the vehicle-trailer unit must make wider turns. Those unaccustomed to operating vehicle-trailer units may have some difficulty in accurately controlling the path of the trailer.

Additionally, the difficulty of maneuvering a vehicle-trailer unit is compounded when the vehicle-trailer unit is traveling in the reverse. When the vehicle backs up, it pushes the trailer. Drivers are often confused as to which way to turn the vehicle steering wheel to get the desired change of direction of the trailer. Applying an incorrect steering angle in the vehicle may also cause the trailer to jack-knife and lose its course or otherwise maneuver the vehicle-trailer unit into a situation which they do not know how to exit.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF SUMMARY

In one exemplary embodiment, a method of controlling a vehicle-trailer unit includes recording, with an electronic control unit for a trailer assist system, a plurality of maneuvers of the vehicle-trailer unit as each maneuver is executed in an original direction of travel. The method also includes retrieving the recorded plurality of maneuvers in response to an initiating of a tight spot reversal feature for the trailer assist system. The method further includes instructing vehicle systems to perform the retrieved recorded plurality of maneuvers in the reverse order and direction of travel in which they were recorded.

In another exemplary embodiment, a method of controlling a vehicle-trailer unit includes determining, with an electronic control unit of a trailer assist system, that continued movement in a current direction of travel is likely to result in a collision with an obstacle. The method also includes determining with the electronic control unit a new position where travel of the vehicle-trailer unit in the original direction of travel is not likely to cause a collision. The method further includes calculating with the electronic control unit at least one maneuver of the vehicle-trailer unit in a reverse direction of travel to move the vehicle-trailer unit to the new position. The method also includes instructing the vehicle systems to perform the at least one maneuver in the reverse direction of travel until the vehicle trailer unit reaches the new position.

In one exemplary embodiment, a trailer assist system for a vehicle-trailer unit includes an electronic control unit. The electronic control unit is configured with instructions to record a plurality of maneuvers of the vehicle-trailer unit as each maneuver is executed in an original direction of travel, retrieve the recorded plurality of maneuvers response to an initiating of a tight spot reversal feature, and instruct vehicle systems to perform the retrieved recorded plurality of maneuvers in the reverse order and direction of travel in which they were recorded.

BRIEF DESCRIPTION OF THE DRAWINGS

The present disclosure will become more fully understood from the detailed description and the accompanying drawings, wherein:

FIG. 1 is a schematic diagram of a vehicle and trailer assembly having a trailer backing system of the present invention.

DETAILED DESCRIPTION

The following description is merely exemplary in nature and is in no way intended to limit the disclosure, its application, or uses. For purposes of clarity, the same reference numbers will be used in the drawings to identify similar elements. FIG. 1 illustrates a vehicle 10 and a trailer 11. The vehicle 10 may be a car, truck, tractor, etc. The trailer 11 is controllably secured to the vehicle 10 to form a vehicle-trailer unit 12. The vehicle-trailer unit 12 utilizes a trailer assist system 14 of the present invention.

The trailer assist system 14 includes an electronic control unit (ECU) 22. The ECU 22 records the maneuvers of the vehicle-trailer unit 12. The ECU 22 may be able to communicate with other vehicles systems 24, such as steering and breaking systems. The ECU 22 may send instructions to the other systems 24 for maneuvering the vehicle-trailer unit 12, and/or may received signals from the systems 24 to record the maneuvers of the vehicle-trailer unit 12 as input by a vehicle operator.

The trailer assist system 14 may also be used to assist in backing the vehicle-trailer unit 12. In such instances, the ECU 22 may also determine the steering and/or braking necessary to move the vehicle-trailer unit 12 through desired backing maneuvers and send signals with instructions for completing the calculated maneuvers to other vehicles systems 24.

When operating vehicle-trailer units 12, in forward towing or in reverse backing situations, the operator may find themselves in a "tight spot" situation where continued travel in the current direction, either forward or reverse, is no longer possible due to nearby obstacles and the likelihood of a collision. In such tight spot situations, the vehicle operator must maneuver in the opposite direction to extract the vehicle-trailer unit 12 from the tight spot. However, maneuvering the vehicle-trailer unit 12 in the opposite direction to extract from the tight spot can be just as difficult or more difficult for the vehicle operator than the original movements. In such as situation, the vehicle operator may activate the trailer assist system 14 to initiate a tight spot reversal feature 16.

In operation of the tight spot reversal feature 16, the ECU 22 may retrieve the recorded maneuvers of the vehicle-trailer unit 12 and instruct the vehicle-trailer unit 12 to perform those maneuvers in the reverse order in which they are executed. The recorded maneuvers may include direction of travel (e.g., current transmission gear), distance of movement, steering angle, etc. This is illustrated by line 26 showing the path of the original maneuvers of the vehicle-trailer unit 12 and the path which the vehicle-trailer unit 12 travels in the reverse direction during the tight spot reversal to return to the original position 27.

In the exemplary embodiment, the trailer assist system 14 may perform a preset number of maneuvers in the reverse order at a time, e.g., the last three recorded maneuvers. Alternatively, the ECU 22 may perform one movement at a time in the reverse order. The vehicle operator may continue requesting the trailer assist system 14 to perform maneuvers in the reverse order until the operator deems the vehicle-trailer unit 12 in a situation where the operator is comfortable to continue travel in the original direction.

Alternatively, the trailer assist system 14 may perform the maneuvers in the reverse order until the trailer assist system 14 determines that the vehicle-trailer unit 12 in a situation where continued travel in the original direction is possible. In such situations the trailer assist system 12 may use information from other vehicle systems 24, sensors and cameras to locate nearby obstacles 48 and confirm clearance from those obstacles 48 for travel in the original direction is possible.

In another embodiment of employing the tight spot reversal feature 16, the ECU 22 may calculate a new series of maneuvers to reverse the vehicle-trailer unit 12 from the tight spot. In this embodiment, the new series of maneuvers may not be a replica of the last movements of the vehicle-trailer unit 12, rather the new series of maneuvers may be an efficient extraction of the vehicle-trailer unit 12 from the tight spot situations. This is illustrated by line 28, which moves the vehicle-trailer unit 12 from the tight-spot at 29 to a new position. From the new position the vehicle-trailer unit 12 may take another maneuver path 30 to more easily pass through the obstacles 48.

In this manner the tight spot reversal feature 16 of the trailer assist system 14 can maneuver the vehicle-trailer unit 12 out of a situation where an operator cannot or does not know how to continue movement in the current direction of travel, thus allowing them to try again.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling a vehicle-trailer unit having a vehicle attached to a trailer, the method comprising:
    recording with an electronic control unit for a trailer assist system a plurality of maneuvers of the vehicle-trailer unit as each maneuver is executed in a first direction of travel;
    retrieving the recorded plurality of maneuvers in response to an initiating of a tight spot reversal feature for the trailer assist system;
    receiving information from other vehicle systems, sensors and cameras; and
    instructing vehicle systems supported by the vehicle to move along a second direction of travel by performing the retrieved recorded plurality of maneuvers in the reverse order and direction of travel in which they were recorded;
    determining by the trailer assist system based on the information whether the vehicle-trailer unit is in a situation where continued travel in the first direction is possible;
    in response to an affirmative determination that the vehicle-trailer unit is in the situation where continued travel in the first direction is possible, ceasing instructing the vehicle systems to move along the second direction of travel so as to cease performing the retrieved recorded plurality of maneuvers in the reverse order and direction of travel, wherein
        when the first direction of travel is a forward direction, the second direction of travel is a rearward direction; and
        when the first direction of travel is the rearward direction, the second direction of travel is the forward direction.

2. The method of claim 1, wherein each of the recorded plurality of maneuvers includes direction of travel, distance of movement, and steering angle.

3. The method of claim 1, wherein instructing vehicle systems to perform the retrieved recorded plurality of maneuvers further comprises performing one of the plurality of maneuvers at a time.

4. A trailer assist system for a vehicle-trailer unit having a vehicle attached to a trailer, the system comprising:
    an electronic control unit supported by the vehicle-trailer unit and configured with instructions to:
        record a plurality of maneuvers of the vehicle-trailer unit as each maneuver is executed in a first direction of travel,
        retrieve the recorded plurality of maneuvers in response to an initiating of a tight spot reversal feature,
        receiving information from other vehicle systems, sensors and cameras, and
    instruct vehicle systems supported by the vehicle to move along a second direction of travel by performing the retrieved recorded plurality of maneuvers in a reverse order and direction of travel in which they were recorded;
    determining, by the trailer assist system based on the information, whether the vehicle-trailer unit is in a situation where continued travel in the first direction is possible; and
    in response to an affirmative determination that the vehicle-trailer unit is in the situation where continued travel in the first direction is possible, ceasing instructing the vehicle systems to move along the second direction of travel so as to cease performing the retrieved recorded plurality of maneuvers in the reverse order and direction of travel, wherein:
        when the first direction of travel is a forward direction, the second direction of travel is a rearward direction; and
        when the first direction of travel is the rearward direction, the second direction of travel is the forward direction.

5. The system of claim 4, wherein each of the recorded maneuvers includes direction of travel, distance of movement, and steering angle.

6. The system of claim 4, wherein the electronic control unit is further configured with instructions to instruct vehicle systems to perform the recorded plurality of maneuvers one at a time.

\* \* \* \* \*